United States Patent
Anger et al.

[11] Patent Number: 5,884,732
[45] Date of Patent: Mar. 23, 1999

[54] COMPOSITE BRAKE ADAPTER

[75] Inventors: Stefan U. Anger, Oxford; Bernhard Kullmann; William M. Sullivan, both of Rochester Hills, all of Mich.

[73] Assignee: ITT Manufacturing Enterprises Inc., Wilmington, Del.

[21] Appl. No.: 820,405

[22] Filed: Mar. 12, 1997

[51] Int. Cl.⁶ .................................................. F16D 65/38
[52] U.S. Cl. .................... 188/73.39; 188/73.31
[58] Field of Search ............................ 188/73.31, 73.39, 188/72.4, 18 A, 71.1, 73.44, 73.45; 72/379

[56] References Cited

U.S. PATENT DOCUMENTS

| | | | |
|---|---|---|---|
| 3,949,839 | 4/1976 | Girauldon | 188/73.39 |
| 4,031,986 | 6/1977 | Thompson | 188/72.4 |
| 4,485,897 | 12/1984 | Kawaguchi et al. | 188/73.39 |
| 4,705,145 | 11/1987 | Goulart | 188/73.31 X |

*Primary Examiner*—Peter M. Poon
*Attorney, Agent, or Firm*—Rader, Fishman & Grauer PLLC

[57] ABSTRACT

A composite brake adapter for a caliper disc brake assembly is made up of a first pre-stamped part of a sheet of metal adapted to match an axle housing of the assembly, and of a second part cast onto an upper surface of the first part to adhere thereto, additional structural elements providing matching of the second part with a caliper of the assembly being made an integral part of the second part. A method of making a composite brake adapter for a caliper disc brake assembly comprises the steps of providing a first part of the adapter, the first part being provided with mounting holes to match an axle housing of the assembly and being made of a sheet of metal; placing the first part into a mold, and casting a second part of the adapter into the mold onto a surface of the first part. To incorporate additional structural elements of the adapter with a caliper of the assembly, the additional structural elements are placed into a precision fixture and secured within the mold prior to casting the second part.

8 Claims, 3 Drawing Sheets

COMPOSITE BRAKE ADAPTER

BACKGROUND OF THE INVENTION

1. Field of the Invention

The present invention relates generally to vehicle brake apparatus, and is particularly concerned with caliper disc brakes for rear drive vehicles. Still more particularly, the invention relates to disc brake adapter comprised of a composite structure.

2. Description of Related Art

Caliper disc brakes are well known in the art. Presented schematically in FIG. 1 and presented in a spatial arrangement in FIG. 2 are illustrations of a typical prior art structure of caliper disc brakes. Drive axle 10 is operatively connected to revolving disc 11 which is also connected to wheel lugs 12. As drive axle 10 rotates, wheel lugs 12 which are connected to a vehicle wheel 13 by means of a wheel hub 14 rotate wheel 13. Axle housing 15 encloses drive axle 10 which is suitably mounted therein by means of axle bearing 16.

Secured to drive axle housing 15 by way of brake adapter 17 is brake caliper 18. Brake caliper 18 functions to transmit braking forces from brake pads 23 to housing 15. Brake adapter 17 is typically bolted to drive axle housing 15 and is fitted to accept caliper 18. Caliper 18 is comprised of a casting 19 accommodating at least one brake cylinder 20 in which piston 21, which is adapted for a reciprocal movement, is mounted. Cylinder 20 and piston 21 cooperate to define pressure chamber 22 which is pressurized by hydraulic fluid when the brake is actuated. Brake pad (or lining) assembly 23 is mounted on caliper 18 and is moved toward revolving disc 11 when piston 21 is moved outwardly in cylinder 20 due to brake pressure in chamber 22. In so doing, piston 21 and brake lining 23 cooperatively exert a friction force on the disc 11.

It has been general practice to use stamped sheet metal to form a brake adapter. U.S. Pat. Nos. 3,949,839 and 4,031,986 disclose such a practice.

The adapter usually carries slide pins and torque rails for the caliper. In the case of the caliper disc brakes used for rear drive vehicles, the adapter also carries a bushing for the parking (emergency) brake cable and torque rails for the parking brake. The adapter transmits all braking loads to the drive axle tube. When all of these elements are mounted on the adapter, it must possess substantially higher rigidity than an adapter made of a relatively thin sheet metal. If sheet metal is used, it must be of sufficient thickness to meet the rigidity demands of the application, and the sheet metal which would meet these demands is generally not cost effective. The required strength/rigidity can be achieved through making the adapter of nodular iron or some other material that is easily cast. However, to properly attach the cast brake adapter to the drive axle housing, several machining steps are necessary in order to conform the casting to its precise dimensions so that it can be accurately aligned and fitted to the housing. These machining operations add to the overall cost of the vehicle.

SUMMARY OF THE INVENTION

Accordingly, it is a principal object of the present invention to provide a brake adapter for a caliper disc brake which possesses all of the advantages of prior art adapters and, at the same time, is free of their disadvantages.

It is another object of the present invention to provide a composite adapter for a caliper disc brake.

Yet another object of the present invention is to provide a composite adapter for a caliper disc brake which requires little if any machining.

Another principal object of the present invention lies in providing a novel method of making a caliper adapter for a caliper disc brake.

According to the above objects of the invention, there is provided a brake adapter for a vehicle caliper disc brake assembly, which assembly has a revolving disc, connected to a wheel and adapted to rotate as a drive axle rotates the wheel, and a caliper accommodating a pressure chamber and a brake pad adapted to be urged against the revolving disc by a force of a hydraulic fluid pressurized in the pressure chamber when the brake is actuated and to exert a friction force on the revolving disc. The caliper is secured to a housing of the drive axle through the mediation of the brake adapter, which brake adapter is formed as a composite of a first part and a second part. For the first part of the adapter, a prefabricated sheet metal part adapted to be attached to the axle housing is used, whereas the second part adapted to be attached to the caliper is proposed to be formed by casting a metal onto a surface of the first part to adhere thereto.

The caliper torque rails which are necessary for proper matching the adapter with the caliper of the assembly are proposed to make a part of the second part of the adapter by means of placing the rails in a cast form, for them to become an integral part of the second part of the adapter by being surrounded by the cast metal.

A bracket for a parking brake cable and torque rails for a parking brake intended to respectively be connected to and to match with a parking brake unit are also proposed to be a part of the second part of the adapter by means of placing the parking brake bracket and rails in a cast form, for them to become an integral part of the second part of the adapter by being surrounded by the cast metal.

According to a process aspect of the present invention, a method of making a brake adapter for a caliper disc brake assembly comprises the steps of providing a first part of the adapter, the first part having mounting holes to match an axle housing in the assembly and being made of a sheet of metal; placing the first part into a form; and casting a second part of the adapter into the form onto an upper surface of the first part.

The method according to the present invention may also further comprise steps of placing caliper torque rails into the form, and securing the caliper pins and rails in a predetermined position within the form prior to casting.

Also, the method according to the present invention may further comprise steps of placing a bracket for a parking brake cable and torque rails for a parking brake into the form, and securing the parking brake bracket and rails in a predetermined position within the form prior to casting.

BRIEF DESCRIPTION OF DRAWINGS

Other objects, advantages and features of the present invention will become apparent from the ensuing description taken in connection with the accompanying drawings in which.

DETAILED DESCRIPTION OF THE PREFERRED EMBODIMENTS

Figure 1:
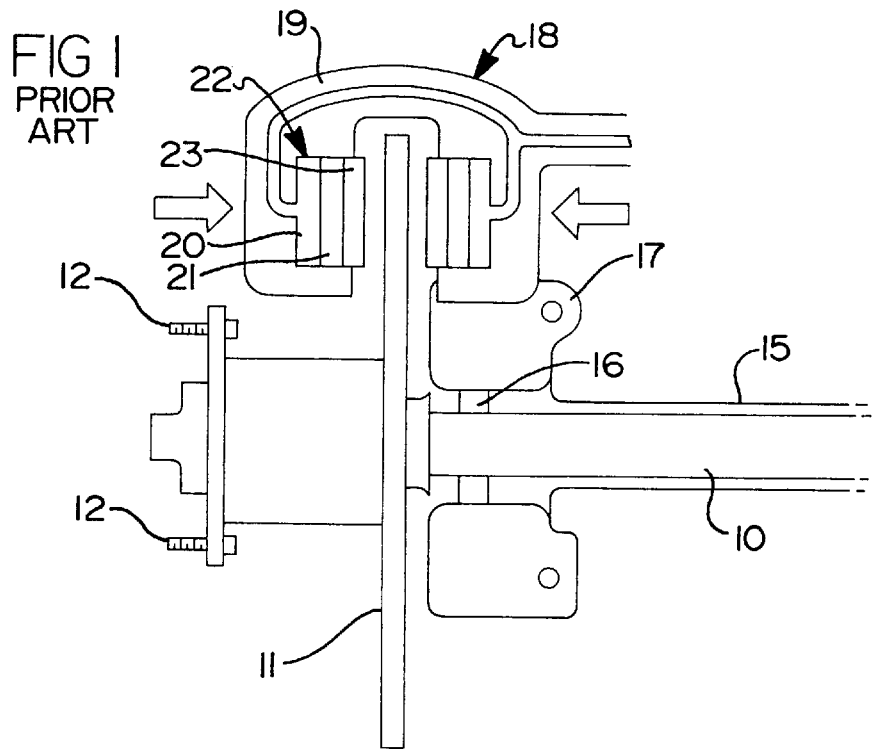
FIGS. 1 and 2 are illustrations of a prior art brake structure with a brake adapter.
Figure 2:
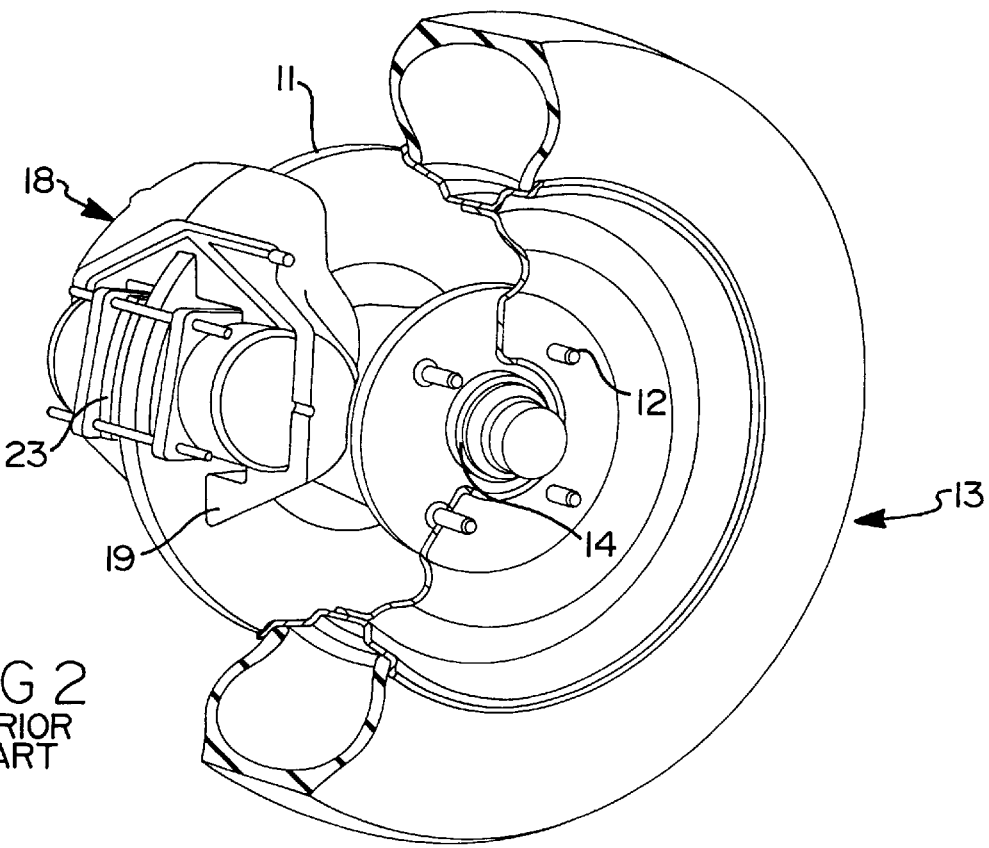
Figure 3:
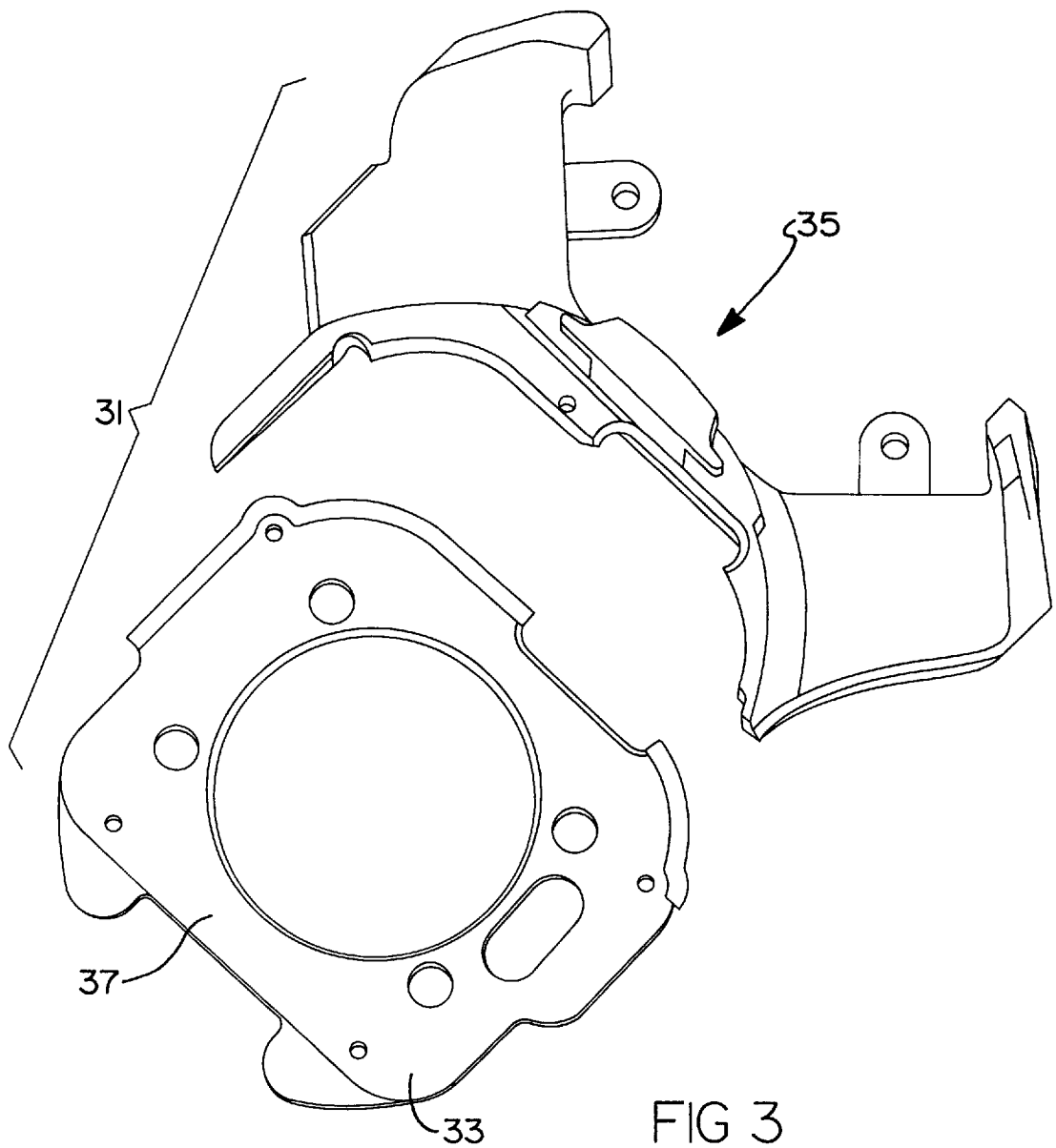
FIG. 3 shows an exploded view of a first embodiment of the caliper brake adapter of the present invention.

Referring now to FIG. 3, a two-part brake adapter 31 is constructed of a composite of a sheet metal part 33 and a cast part 35. The part of the brake adapter 31 which bolts to a drive axle housing (not shown in FIG. 3) has a reference of 33 and is comprised of sheet metal, whereas the part of the brake adapter 31 which fastens to the caliper (not shown in FIG. 3) is referenced by 35 and is preferably comprised of cast iron; however, other materials may be used which exhibit strength characteristics comparable to that of cast iron. One such possible material is a class of plastics known as technical (or engineering) plastics. With the advent of engineering plastics and constant improvements thereto relating to improved strength, and increased durability, technical plastics are finding application in the design of structural components which heretofore have only been comprised of metal. The parts 33 and 35 of the adapter 31 are joined together by casting the part 35 onto an upper portion 37 of the part 33. This casting is typically achieved by creating a casting form, or a mold, normally of sand (the form is not shown), which accepts the finished stamped sheet metal part 33 therein. The part 33 is provided with all necessary mounting holes. The exact location of the part 33 in the casting form is ensured by stamped location holes. After the molded cast iron has been poured into the mold capping the sheet metal part 33, it cools and adheres to the part 33. When the brake adapter 31 is fashioned this way, there is no machining operation which must be done thereto in order to make the adapter conform with the drive axle housing (not shown in FIG. 3). Since it is the sheet metal part 33 of the adapter 31 that provides the conformity, the part 33 may be accurately stamped, whereby no additional machining operations are necessary thereafter. The method as described is suitable for permanent molding or for a sand casting process. The inherit problems of the sand casting process (i.e. mold shift, problems of positioning cores, etc.) can be compensated by secondary machining to create a finished brake adapter.

Figure 4:
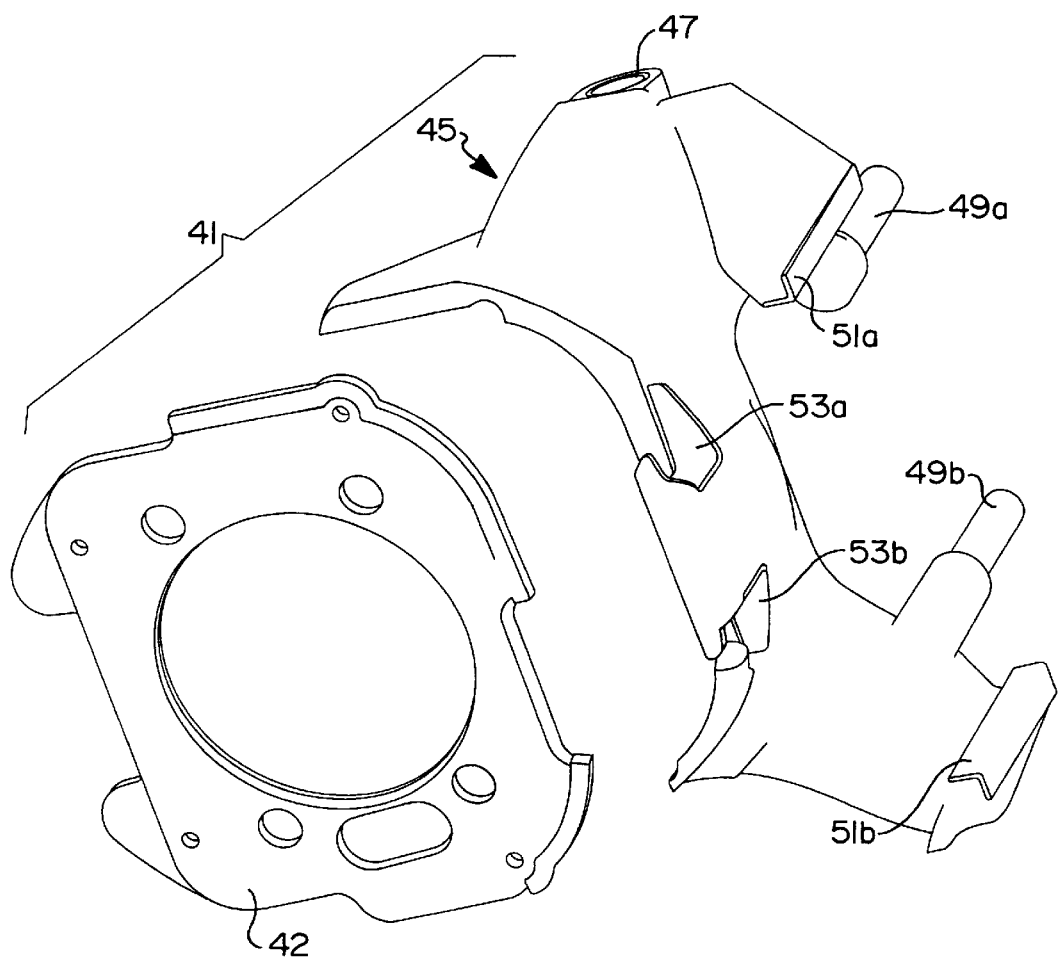
FIG. 4 shows an exploded view of a second embodiment of the caliper brake adapter of the present invention.

In a second aspect of the present invention illustrated by FIG. 4, an improved brake adapter 41 is shown similarly constructed of a sheet metal part 43 and a casting part 45. For this case, the adapter 41 may comprise additional structural elements that must be fastened to the casting in order to complete the final product. Accordingly, depicted in FIG. 4 are a bracket 47 for a parking brake cable, two slide pins 49a, 49b and two torque rails 51a, 51b for mounting the caliper, and two torque rails 53a, 53b for mounting the parking brake. Prior to casting the part 45, these structural elements—the bracket 47, sliding pins 49, torque rails 51 and 53 and sheet metal part 43—are preferably placed in a precision fixture (not shown) and securely held in place by the mold. Because of the precise nature in which elements 47 through 53 can be machined and/or otherwise formed prior to casting, they provide exact surface tolerances, and little or no machining operations are necessary.

In view of the above disclosure, a method of making a brake adapter for a caliper disc brake assembly may be resumed as a combination of steps of having a first part of the adapter intended to match the axle housing and preferably made as a pre-stamped part of a metal sheet, the first part being provided with mounting holes; placing the prefabricated first part into a form (mold); and casting a second part of the adapter into the form onto an upper surface of the first part. Additional structural elements of the adapter, intended to properly connect the adapter to the caliper and to match therewith, as well as to receive such units as a parking brake (not shown), are placed into the form prior to casting, secured in predetermined positions therein, and, partially submerged into the casting, become an integral part thereof after cooling the casting.

Employing the technique of the present invention presents a possibility of the direct replacement of an existing rear drum brake system by a disc and having "drum in hat" center portion for accommodating a parking brake assembly without the need to modify such vehicle features as track, axle, etc., inasmuch as the sheet metal parts of identical thickness can be used for the adapter.

While specific apparatus and process have been shown heretofore to illustrate the preferred embodiments of the present invention, it will be understood by those skilled in the art that various modifications, configurations, changes, and sub-assemblies can be made without departing from the spirit and scope of the present invention which is limited only by the appended claims.

What is claimed is:

1. A brake adapter for a vehicle caliper disc brake assembly, said assembly of the type including a revolving disc connected to a wheel and adapted to rotate as a drive axle rotates said wheel, and a caliper accommodating a pressure chamber and a brake pad adapted to be urged against said revolving disc by a force of a hydraulic fluid pressurized in said pressure chamber when said brake is actuated and to exert a friction force on said disc, said caliper being secured to a housing of said drive axle through the mediation of said brake adapter, comprising:

a composite assembly having a first part and a second part, said first part being a prefabricated sheet metal part adapted to be attached to said axle housing, said second part, which is adapted to be attached to said caliper, being formed by casting a metal onto a surface of said first part.

2. The brake adapter according to claim 1, further comprising caliper slide pins and caliper torque rails, said caliper pins and rails being made a part of said second part of said adapter by means of placing said caliper pins and rails in a cast form, for said caliper pins and rails to be surrounded by said cast second part.

3. The brake adapter according to claim 1, further comprising a bracket for a parking brake cable and torque rails for a parking brake, said parking brake bracket and rails being made a part of said cast second part of said adapter by means of placing said parking brake bracket and rails in a precision fixture, for said parking brake bracket and rails to be surrounded by said cast second part.

4. The brake adapter of claim 1, wherein said second part is comprised of metal.

5. The brake adapter of claim 1, wherein aid second part is comprised of plastic.

6. A method of making a brake adapter for a caliper disc brake assembly, said method comprising the steps of:

(a) providing a first part of said adapter, said first part being provided with mounting holes to match an axle housing in said assembly and being made of a sheet of metal;

(b) placing said first part into a mold, and (c) casting a second part of said adapter into said mold onto a surface of said first part.

7. The method according to claim 6, further comprising steps of placing caliper slide pins and caliper torque rails into said mold, and securing said caliper pins and rails in a predetermined position within said mold prior to said casting said second part.

8. The method according to claim 6, further comprising steps of placing a bracket for a parking brake cable and torque rails for a parking brake into said mold, and securing said parking brake bracket and rails in a predetermined position within said mold prior to said casting said second part.

* * * * *

UNITED STATES PATENT AND TRADEMARK OFFICE
CERTIFICATE OF CORRECTION

PATENT NO. : 5,884,732
DATED : March 23, 1999
INVENTOR(S) : Stefan U. Anger; Bernhard W. Kullmann; and Michael M. Sullivan It is certified that error appears in the above-identified patent and that said Letters Patent is hereby corrected as shown below:

Column 4, Line 43 (Claim 5, Line 1)
Replace "aid" with --said--

Signed and Sealed this

Fourth Day of April, 2000

Q. TODD DICKINSON

Attest:

Attesting Officer

Director of Patents and Trademarks